(12) United States Patent
Lovelace et al.

(10) Patent No.: US 10,552,643 B2
(45) Date of Patent: Feb. 4, 2020

(54) FAST BOOT UP MEMORY CONTROLLER

(71) Applicant: INTEL CORPORATION, Santa Clara, CA (US)

(72) Inventors: John V. Lovelace, Irmo, SC (US); Sreenivas Mandava, Los Altos, CA (US); Debaleena Das, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 15/392,912

(22) Filed: Dec. 28, 2016

(65) Prior Publication Data

US 2018/0181336 A1 Jun. 28, 2018

(51) Int. Cl.
*G06F 21/79* (2013.01)
(52) U.S. Cl.
CPC .................................. *G06F 21/79* (2013.01)

(58) Field of Classification Search
CPC .... G06F 3/0635; G06F 3/0611; G06F 3/0632; G06F 3/0659; G06F 3/0673; G06F 3/0619; G06F 3/064; G06F 11/1076
See application file for complete search history.

(56) References Cited

U.S. PATENT DOCUMENTS

| | | | | |
|---|---|---|---|---|
| 2003/0009654 | A1* | 1/2003 | Nalawadi | G06F 9/4401 713/1 |
| 2013/0179995 | A1* | 7/2013 | Basile | G06F 21/10 726/32 |
| 2017/0024162 | A1* | 1/2017 | Lim | G06F 3/0647 |
| 2018/0039573 | A1* | 2/2018 | Shung | G06F 12/0238 |

* cited by examiner

*Primary Examiner* — Nanci N Wong
(74) *Attorney, Agent, or Firm* — Compass IP Law PC

(57) ABSTRACT

A method performed by a memory controller is described. The method includes, during boot up, issuing a command to a memory to cause the memory to zero out its content. The method also includes bypassing a descrambler when reading from a location in the memory that has not had its zeroed out content written over the scrambled data. The method also includes processing read data with the descrambler when reading from a location in the memory that has had its zeroed out content written over with scrambled data.

24 Claims, 5 Drawing Sheets

US 10,552,643 B2

FAST BOOT UP MEMORY CONTROLLER

FIELD OF THE INVENTION

The field of invention pertains generally to the electronic arts, and, more specifically, to a fast boot up memory controller.

BACKGROUND

Computer system designers are interested in ways to improve user experience. Long computer boot up times may be a unfavorable feature of a computing system to various users. As such, computer system designers are interested in finding ways to reduce a computer's boot up time.

FIGURES

A better understanding of the present invention can be obtained from the following detailed description in conjunction with the following drawings, in which.

DETAILED DESCRIPTION

Figure 1:
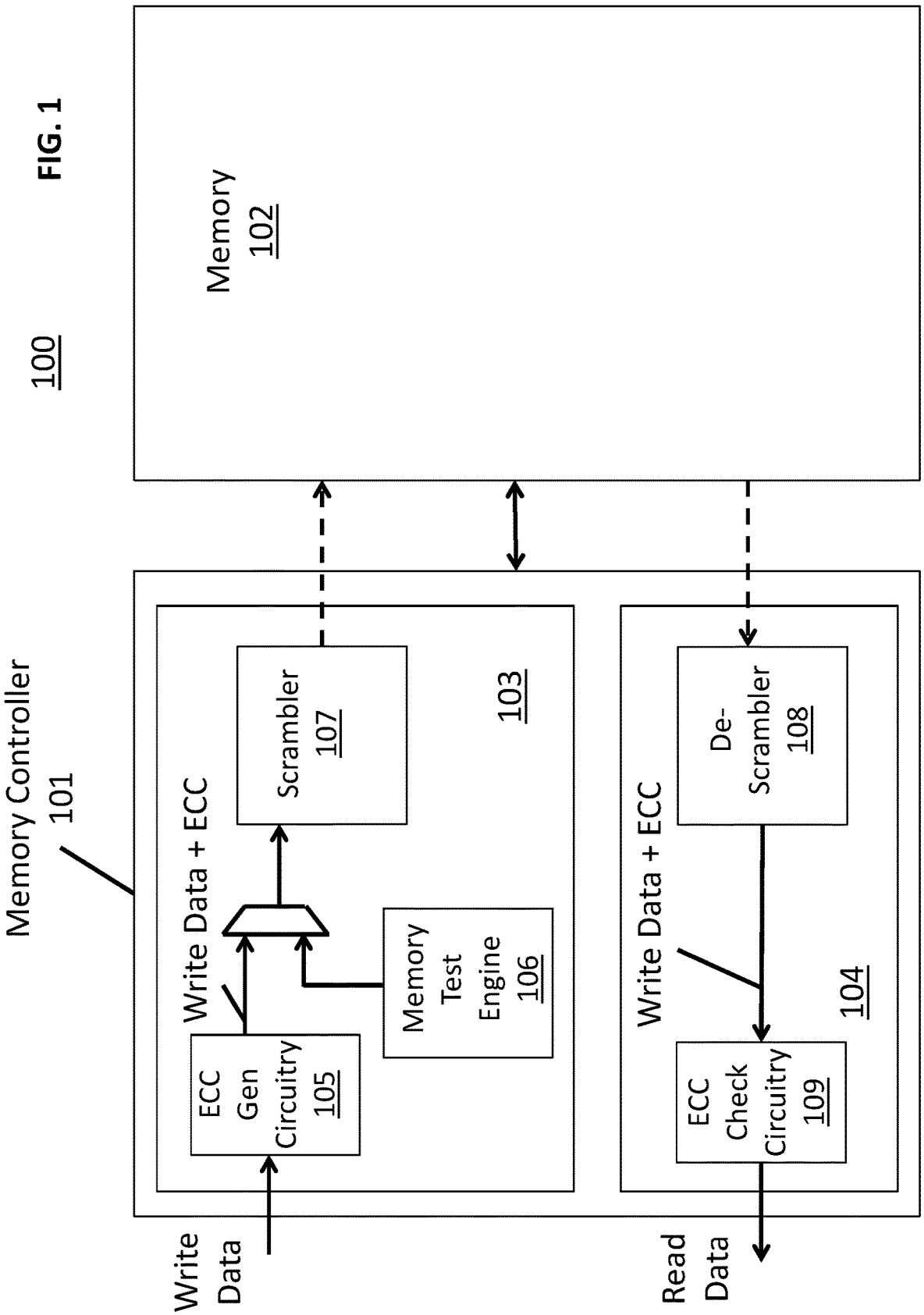
FIG. 1 shows a prior art memory controller.

FIG. 1 shows a prior art main memory sub-system 100 that includes a memory controller 101 having a write data path 103 and a read data path 104. As depicted in FIG. 1, the write data path 103 includes ECC generation circuitry 105, a memory test engine 106 and a data scrambler 107. The purpose of the scrambler 107 is to prevent the transmission of specific data patterns that can become corrupted on account of the data pattern itself through, e.g., inter-symbol interference, ground bounce, etc. The read data path 104 includes a descrambler 108 and ECC checking circuitry 109. As is known in the art, ECC information is appended to data that is stored in memory 102 (which, e.g., may be a system memory also referred to as a main memory). The ECC information is used to identify and correct corruptions to the data that has been stored in memory 102.

Here, according to a normal run-time write process, write data to be written is first processed by ECC generation circuitry 105. The ECC generation circuitry 105 generates ECC information from the write data. Both the write data and the ECC information are then scrambled by the scrambler 107 and written into memory 102. During a normal run-time read process, the data and its ECC information are read back from memory 102 by the memory controller 101 and initially descrambled by a descrambler 108. The descrambled read data and ECC information are then processed by ECC checking circuitry 109.

The ECC checking circuitry 109 includes internal ECC generation circuitry which generates local ECC information from the read data. The ECC checking circuitry 109 then compares the local ECC information with the descrambled ECC information read from memory 102. If the local ECC information matches the read ECC information the data is not corrupted. As such the read data is forwarded from the memory controller 101 to the requestor (e.g., another component of a computing system that requested the read data).

If the ECC information pairs do not match there is a corruption in the read data which in many cases can be corrected by the error correction circuitry 109. If the corruption can not be corrected an error flag is raised.

As observed in FIG. 1 the memory controller 101 also includes a memory test engine 106 along its write path 103. The memory test engine 106 is used during system boot-up and is therefore not typically used during the normal run-time write process. However, during system boot-up, the memory test engine 106 generates write data and ECC information consisting of all 0s. The "all 0" write data and ECC information are scrambled by the scrambler 107 and written into memory 102. Here, the correct ECC information for all zero data is also all zeroes. As such, the test engine 106 generates correct ECC information for the all zero write data that it generates.

However, owing to the complex mathematical operations performed by the scrambler 107, both the scrambled data and scrambled ECC information will not be composed of all zeros. That is, although the input to the scrambler 107 is composed of all zeros for both the data and the ECC information, the scrambled data and scrambled ECC output provided by the scrambler 107, which corresponds to the actual content that is sent to the memory 102, is not composed of all zeroes.

Subsequently, after boot-up, write data can be written over the data generated by the test engine 106 within system memory 102 according to the normal run-time write process described above which includes scrambling by the scrambler 107. The new write data as received by the memory controller 101 is typically not all zeroes. The scrambling of this data and its ECC information (as generated by the ECC generator 105) during the write process is reversed during a subsequent read of the same information by the descrambling performed by the descrambler 108 along the read path 104.

If a read is performed on a memory address that has not yet been written over, the normal run-time memory read process described above can still be performed. Here, the descrambler 108 will create read data of all 0s and ECC data of all 0s from the scrambled data received from the memory 102. Here, recalling that the correct ECC information for all-zero data is also all-zeros, note that the descrambler provides correct ECC information for the all-zero read data. As such, the local ECC information that is calculated from the descrambled all zero data by the ECC checker 109 will match the descrambled all zero ECC information read from memory 102.

A problem with the prior art memory subsystem described above with respect to FIG. 1 is the time consumed by the memory controller 101 writing the data and ECC information consisting of all 0s during boot-up. Here, the entire memory 102 must be filled with zeros as part of an initial wake up state of the computing system. As such, tens of seconds are consumed by the memory controller 101 writing all 0s to every part of memory 102.

Figure 2:
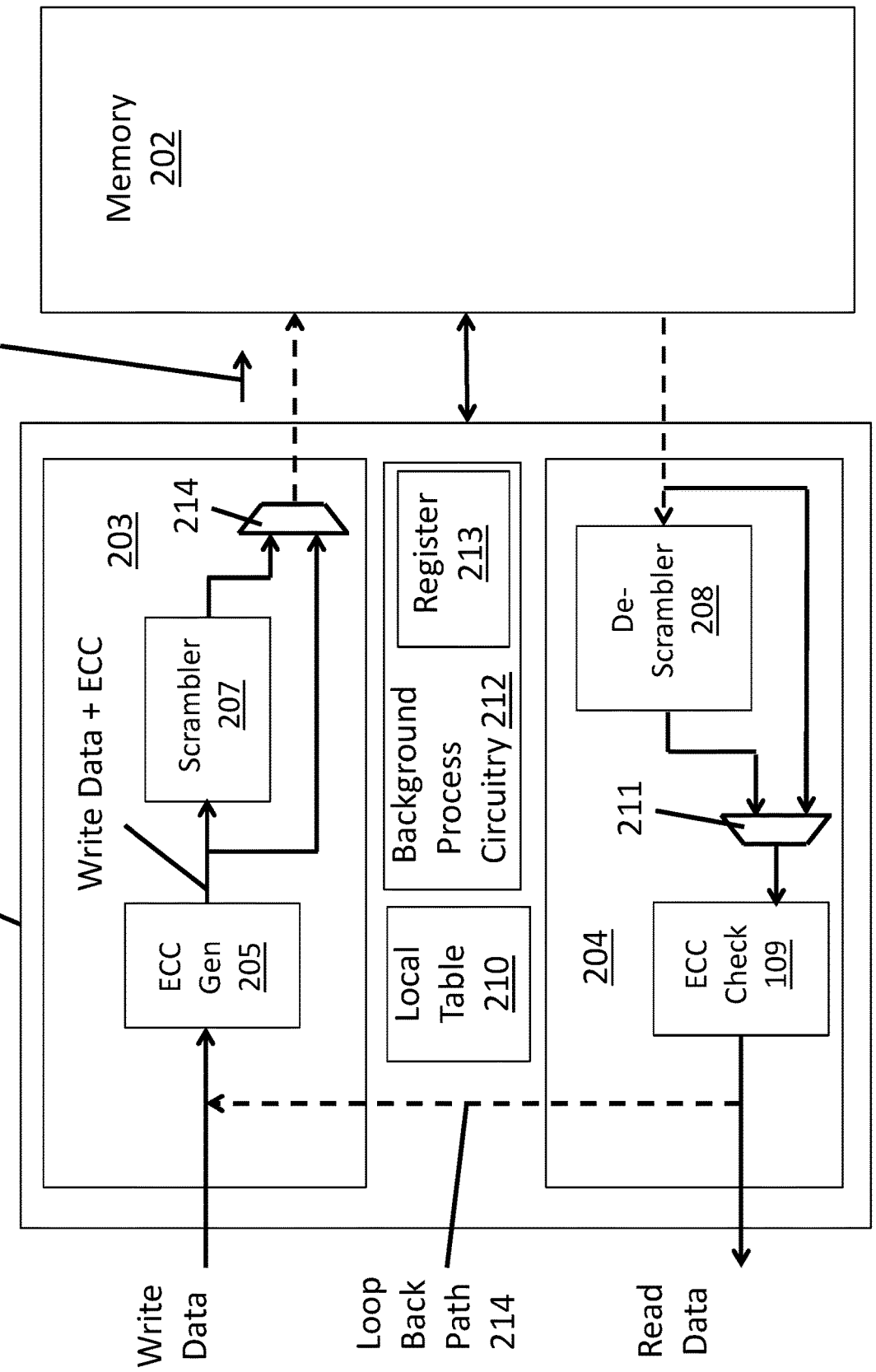
FIG. 2 shows an improved memory controller.

A solution to the problem is presented in FIG. 2. Here, in an embodiment, the memory 202 is composed of types of memory devices designed according to an industry standard or specification such as those promulgated by the Joint Electron Device Engineering Council (JEDEC) that may include, but are not limited to, DDR4 (double data rate (DDR) version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), and/or other technologies based on derivatives or extensions of such specifications. Such memory devices may support a command that "zeroes out" the data cells within the memory devices. That is, upon receipt of this command, a JEDEC compatible memory device may cause all of its storage cells to store a value of zero. As such, with the memory devices of the memory 202 having an ability to set themselves to the initial all zero boot-up state, rather than waste tens of seconds with the memory controller physically writing all 0s into the memory, instead, the memory controllers merely issues the command 220 to the memory 202.

A challenge, however, is the presence of the scrambler 207 and the descrambler 208 in the memory controller 201's write and read data path 203, 204 respectively. Here, as per traditional behavior, a system memory such as memory 202 may always keep scrambled data that needs to be descrambled when read back. After execution of the new zero-out command however, technically, the all-zero content kept by the memory devices of the system memory may not be scrambled. Therefore such data should not be descrambled when being read. The memory controller 201 therefore needs to understand when it is reading data that has not been scrambled and bypass the descrambler 208 along the read data path 204 for such data. By contrast, when the memory controller 201 recognizes that it is reading scrambled data it should utilize the descrambler 208 along the read path 204.

Thus, the elimination of the prior art writing process in favor of the memory devices of a system memory zeroing out their own content invokes a design change in the operation of the memory controller 212. Specifically, as described above, if a read is performed on data that has been physically zeroed in the memory 202, the descrambler 208 should not be utilized when processing such read data. By contrast, if zeroed-out data is written over with new data before a read attempt is made at the same address, a subsequent read should utilize the descrambler 208 because the zeroed data is no longer present but has instead been written over with scrambled data.

As such, as depicted in FIG. 2, in an embodiment, the memory controller 201 also includes a local table 210 that keeps a record of each memory address in memory 202. Commensurate with the command being sent to zero out the internal state of the memory devices included in memory 202, referring to FIG. 2 and the methodology of FIG. 3, every entry in the local table 210 is set 301 to a first state (e.g., a "0"). Any entry in the local table 210 set to the first state indicates that the corresponding memory address for the entry is presently storing the zeroed out information that resulted from the command. Upon a first attempt to write information to a particular address, however, the state for the corresponding entry in the local table 210 is set to a second state (e.g., a "1") to indicate that the corresponding memory space no longer stores locally zeroed information 303.

Upon a read attempt into memory 202, a look-up into local table 210 is performed to access the entry for the memory address that is targeted by the read attempt. If the entry for the memory address indicates the first state, the information at the targeted memory address contains locally zeroed out information. As such, in performing the read operation, a multiplexer 211 in the read path 204 is set to bypass 304 the descrambler 208 along the read path 204. As such, descrambling is not performed on the data and ECC content that is physically received from the memory devices.

By contrast, if upon a read attempt, the look-up into the local table 210 reveals the second state for the targeted memory address, then the targeted memory address no longer stores locally zeroed information (it has been previously written over). As such, in response, the multiplexer 211 will be set to select a read data path that includes 304 the descrambler 208. Again, with the read data address having been previously written to and not being locally zeroed out, the data being read was scrambled as part of its write process. As such, the descrambler 208 will create the original unscrambled data and ECC which nominally should not raise any error flags upon its being processed by the ECC check circuitry 209.

Figure 4:
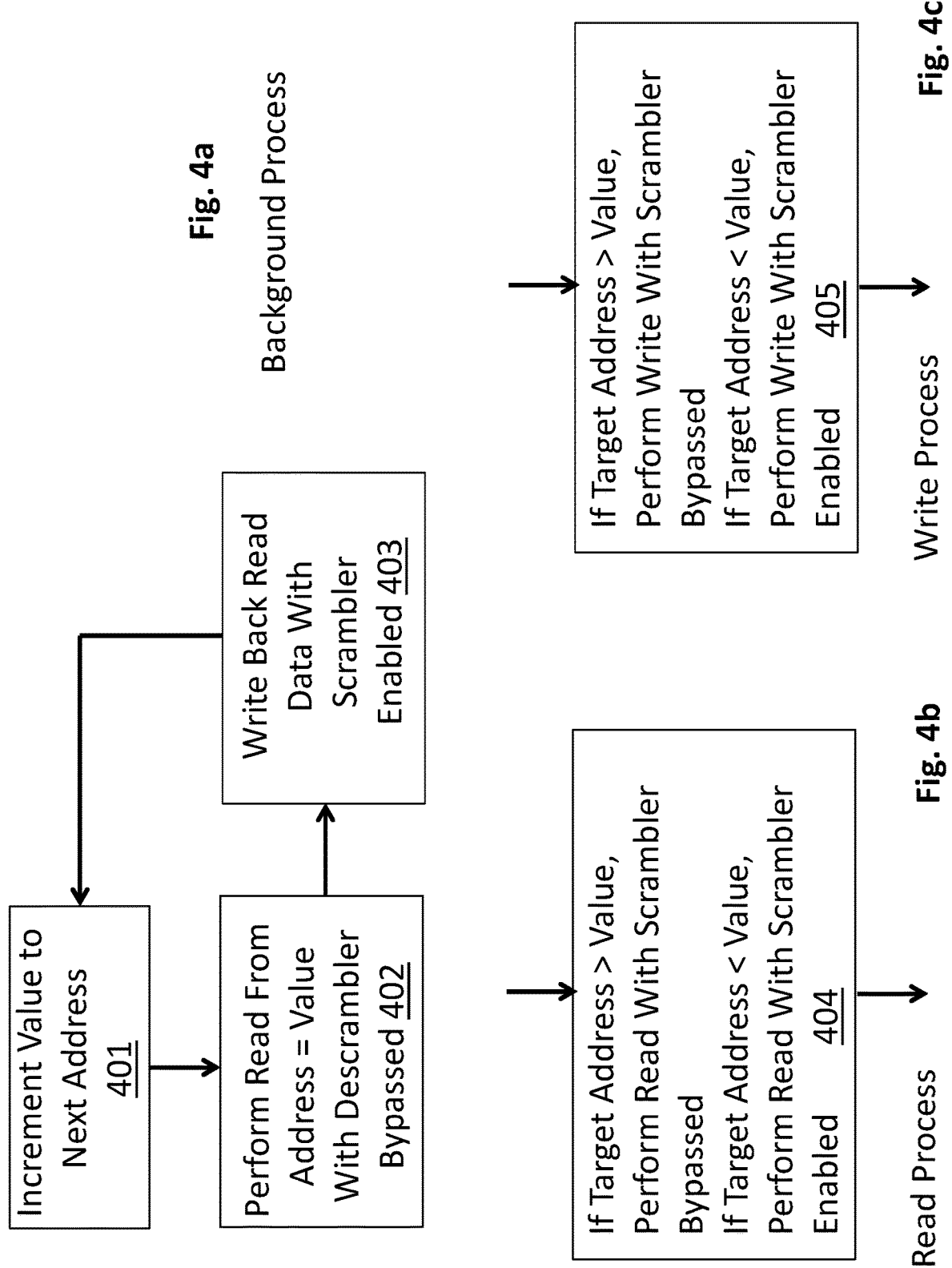
FIGS. 4a, 4b and 4c show features of a second embodiment of operation of the improved memory controller of FIG. 2.

FIGS. 4a through 4c pertain to another embodiment in which, rather than include a local table 210 for ad hoc tracking of which system memory addresses have zeroed out data and which ones do not, instead, the memory controller 201 includes background process circuitry 212 that triggers into action during boot-up or just after boot-up. The background process circuitry 212, starting e.g., at memory address 000 . . . 0 reads content from the memory 202 and, knowing that it is reading locally zeroed out data, sets the read path multiplexer 211 to bypass 402 the descrambler 208. Here, the ECC check circuitry 209 should also validate the non scrambled zeroed out read information.

The circuitry 212 also enables a loop-back path 214 that feeds the output of the read path 204 into the input of the write path 203. The write path 203 processes the all zero information that was just read by the read path 204 and writes the all zero data back into memory 202 at the same memory address that was just read from. The processing performed by the write path 203 includes scrambling 403 the looped back data and its correct ECC information by the scrambler 207 (the input to multiplexer 214 that is fed by scrambler 207 is enabled). Thus the all zero data and ECC information is written back into memory 202 at the same memory address that was just read from but in a scrambled form. In an embodiment, the zeroed out read data is not directed along the loop-back path 214 to the write path 203 unless an ECC check performed by the ECC check circuitry 209 on the read data has been successful. That is, loop-back path 214 will not permit the re-writing of data into a memory address that has just been read from memory 202 but that did not pass its ECC check.

The background process circuitry 212 then increments 401 the memory address and repeats the process. Here, the memory controller 201 need only keep, e.g., in a register 213, the most recent address to be processed (rather than a local table 210 that keeps a record for every address). The circuitry 212 can continue the incremental servicing of memory addresses as described just above, e.g., at a modest pace as a background process. As such the process of reading unscrambled 402 and writing back scrambled 403 data on a per memory address basis can gradually continue after boot-up and into normal run-time. As such, it is likely that the memory controller 201 will receive read and write requests for system memory 202 that are part of the computing system's nominal run-time operation before all system memory addresses have been processed by circuitry 212.

In the case of read processes, as depicted in FIG. 4b, the value in register 213 that keeps track of the most recent memory address to be serviced by the background process of circuitry 212 is analyzed. Because the background process increments a next memory address to be processed in order, those read memory addresses that are less than the value in register 213 corresponds to memory addresses that are storing scrambled data, while those memory addresses that are greater than the value in register 213 correspond to memory addresses that are still storing unscrambled data. Thus, if the target read memory address is less than the value in register 213, the memory controller 201 causes the read path to include 404 the descrambler 208, or, if the target read memory address is greater than the stored value, the memory controller 201 causes the read path to bypass 404 the descrambler 208.

Write requests, as depicted in FIG. 4c, are handled similarly. Here, if a nominal write request is received, the value in register 213 is looked into. If the target memory address is less than the value in register 213, the target memory address corresponds to a memory address that is holding scrambled data. As such, the write path 203 is configured 405 to flow through the scrambler 207 (the input to multiplexer 214 that is fed by the scrambler 209 is selected). By contrast, if the target memory address is greater than the value in register 213, the target memory address corresponds to a memory address that is holding unscrambled data. As such, the write path 203 is configured 405 to bypass the scrambler 207 so that the nominal run time write data is stored in an unscrambled format (the input to multiplexer 214 that bypasses the scrambler is selected).

Eventually the background process being performed by circuitry 212 will complete (all memory addresses will have been processed). Once the background process completes, all memory space is storing scrambled data and the memory controller is configured to permanently enable both the scrambler 207 and descrambler 208 and no longer refer to the value in register 213 for a read request or a write request.

Figure 3:
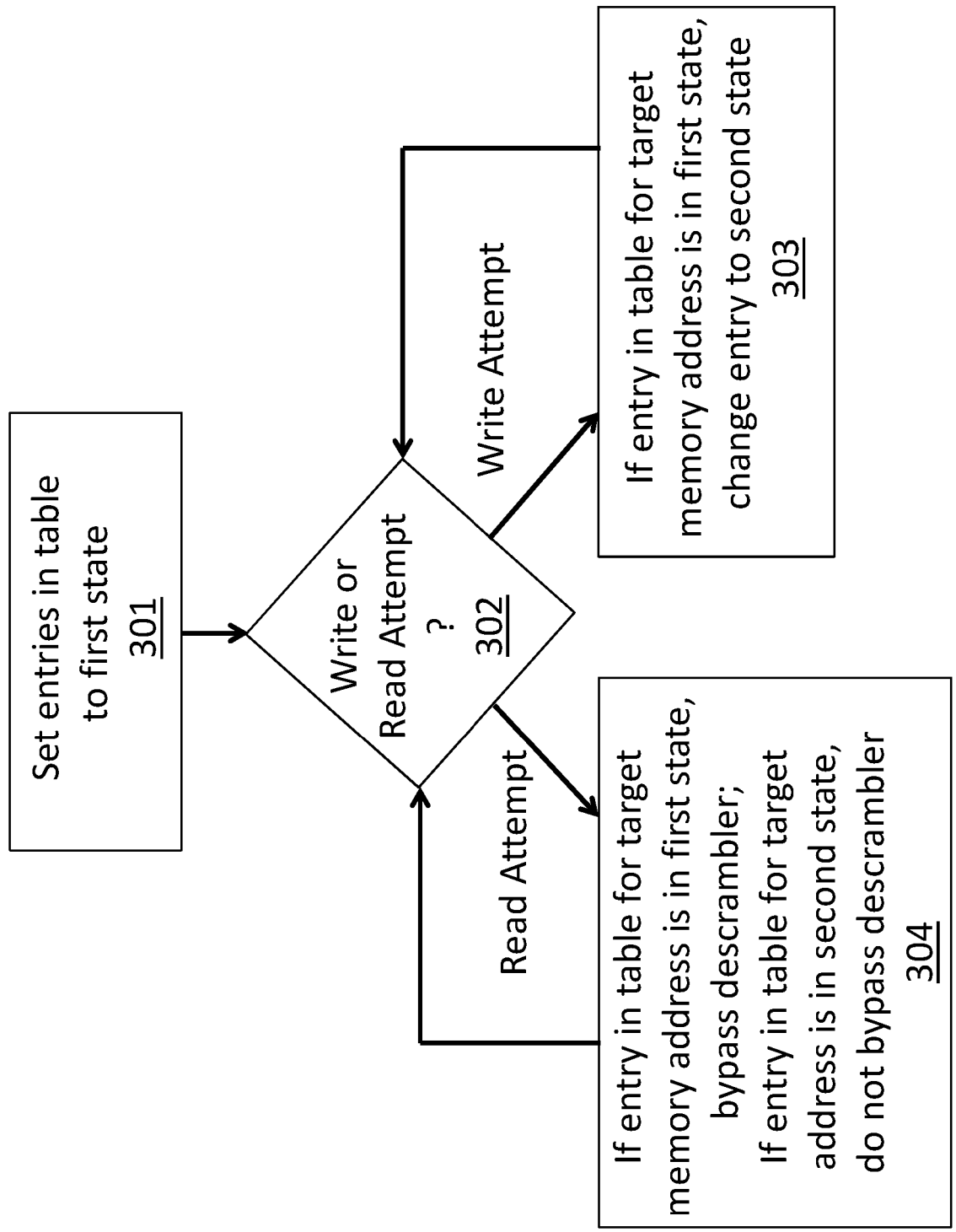
FIG. 3 shows a first embodiment of operation of the improved memory controller of FIG. 2.

For ease of drawing FIG. 2 shows both the ad hoc local table 210 and the background process circuitry 212 within a same memory controller. Those of ordinary skill will understand that if only the approach of FIG. 3 is taken, the background process circuitry 212 need not be present. Likewise, if only the approach of FIGS. 4a-c is taken, the ad hoc local table 210 need not be present. Some embodiments may take both approaches. For example, a first memory address range may rely on the ad hoc local table approach whereas a second memory address range may rely on the background process approach. In further embodiments, the memory may correspond to a multi-level system memory having different performance metrics at different levels (e.g., a first level is faster than the second level). Here, one level may use the ad hoc approach and another level may use the background process approach. The different levels may be assigned different memory address ranges.

The circuitry that controls the read and write processes in view of the ad hoc local table 210 and/or the background process circuitry 212 may be implemented with any of hardwired logic circuitry, programmable logic circuitry, or a processor or controller that executes program code or any combination thereof.

Note that in many systems it is common for operating system software, application software, firmware, etc. to be designed to write all-zero data patterns into a region of memory, or some portion thereof, as a precondition to using it. As is understood in the art, that this type of memory or system memory is commonly "byte addressable" while data is written/read to/from system memory at cache line granularity. Here, if software chooses to only write a small portion of a cache line as all zeros (only a few bytes of a 64 byte cache line), a memory controller for this type of system memory will read the target cache line from the system memory, write the few bytes of new content over the read cache line and write the updated cache line back to system memory. Here, if the cache line as read from system memory contains zeroed out data, it will not be descrambled. By contrast, if the cache line as read from system memory has previously been written to it will contain scrambled data and will therefore be processed by the descrambler.

In various embodiments, system memory may include various types of volatile and/or non-volatile memory. Volatile memory may include, but is not limited to, random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as 3-D cross-point memory that are byte addressable. These byte addressable non-volatile types of memory for memory devices may include, but are not limited to, memory that use chalcogenide phase change material (e.g., chalcogenide glass), single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

In various embodiments, the command to zero out data in a memory device (which in some implementations may be labeled as a Fast Zero Mode command) is triggered by updating a value in a mode register of the memory device. As such, the sending of the command by the memory controller to a memory device to zero out its data includes, more specifically, the memory controller updating the particular mode register in the memory device that the memory device interprets as a data zero out command.

In various embodiments, during execution in normal mode, system software could issue a write with non-zero data content that bypasses the scrambler. In this case, the background process would eventually read the address containing non-zero content that is not scrambled yet, and would write back the non-zero read data along the datapath that includes the scrambler so as to scramble the non-zero data content as part of the rewriting process performed by the background process.

Figure 5:
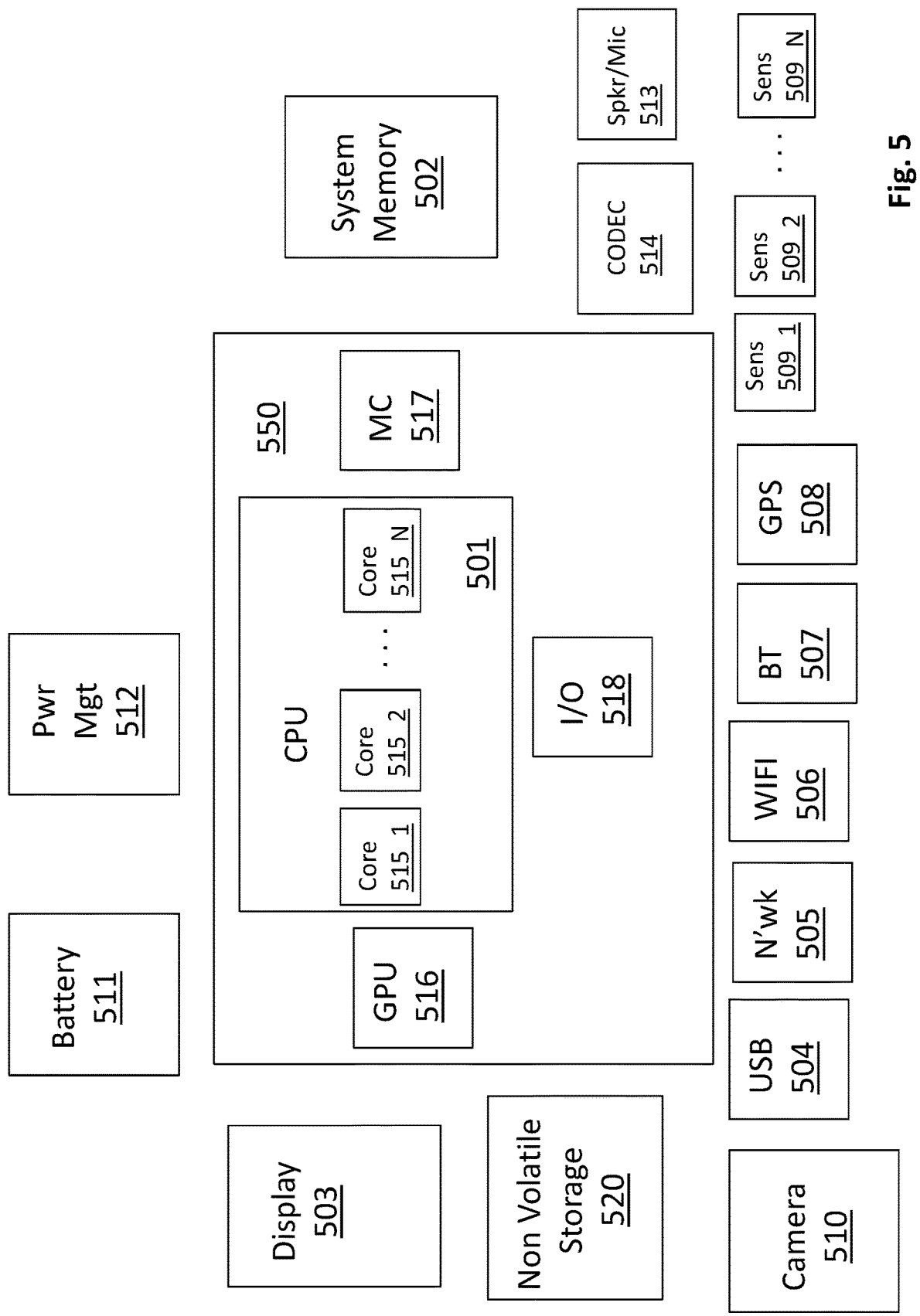
FIG. 5 shows a computing system.

FIG. 5 shows a depiction of an exemplary computing system 500 such as a personal computing system (e.g., desktop or laptop) or a mobile or handheld computing system such as a tablet device or smartphone, or, a larger computing system such as a server computing system. As observed in FIG. 5, the basic computing system may include a central processing unit 501 (which may include, e.g., a plurality of general purpose processing cores and a main memory controller disposed on an applications processor or multi-core processor), system memory 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_N (e.g., one or more of a gyroscope, an accelerometer, a magnetometer, a temperature sensor, a pressure sensor, a humidity sensor, etc.), a camera 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a memory controller) and an I/O control function 518. The general purpose processing cores 515 typically execute the operating system and application software of the computing system. The graphics processing units 516 typically execute graphics intensive functions to, e.g., generate graphics information that is presented on the display 503. The memory control function 517 interfaces with the system memory 502. The system memory 502 may be a multi-level system memory. The memory controller 517 may be designed to issue a command to memory to zero out its content during boot up and then selectively choose between a read data path having a descrambled and a read data path that does not have a descrambled depending on whether the memory location being read from has had its zeroed out content written over with scrambled data or has not had its zeroed out content written over.

Each of the touchscreen display 503, the communication interfaces 504-507, the GPS interface 508, the sensors 509, the camera 510, and the speaker/microphone codec 513, 514 all can be viewed as various forms of I/O (input and/or output) relative to the overall computing system including, where appropriate, an integrated peripheral device as well (e.g., the camera 510). Depending on implementation, various ones of these I/O components may be integrated on the applications processor/multi-core processor 550 or may be located off the die or outside the package of the applications processor/multi-core processor 550. The mass storage of the computing system may be implemented with non volatile storage 520 which may be coupled to the I/O controller 518 (which may also be referred to as a peripheral control hub).

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An apparatus has been described. The apparatus includes a memory controller comprising a first read datapath and a second read datapath. The first read datapath comprises a descrambler. The second read datapath bypasses the descrambler. The memory controller is to couple to a memory. The memory controller is to issue a command to the memory upon boot-up to cause the memory to zero out its content. The memory controller is to enable the first datapath when reading from a location in the memory that has had its zeroed out content written over with scrambled data. The memory controller is to enable the second datapath when reading from a location in the memory that has not had its zeroed out content written over with scrambled data.

In various embodiments the memory controller further comprises a first write datapath and a second write datapath where the first write datapath comprises a scrambler and the second write datapath bypasses the scrambler. In further embodiments the memory controller is to enable the first write datapath when writing to a memory location that is storing scrambled content and is to enable the second write datapath when writing to a memory location that is not storing scrambled content. In other further embodiments the apparatus comprises background process circuitry to read from memory addresses containing non-scrambled data content in order and to write back the non-scrambled read data content along the first write datapath so as to scramble the non-scrambled read data prior its write back. The background process circuitry comprises circuitry to store information that indicates which memory addresses have been written back with scrambled read data content. Further still, the memory controller may refer to the information when servicing a read request to understand whether to enable the first read datapath or the second read datapath. Also further still, the memory controller may refer to the information when servicing a write request to understand whether to enable the first write datapath or the second write datapath.

In various embodiments the memory controller comprises circuitry to keep information that indicates which addresses of the memory have been written to with scrambled data and which addresses of the memory have not been written to with scrambled data.

A computing system having the aforementioned apparatus has also been described.

A method performed by a memory controller has also been described. The method comprises, during boot up, issuing a command to a memory to cause the memory to zero out its content. The method also includes bypassing a descrambler when reading from a location in the memory that has not had its zeroed out content written over the scrambled data. The method also includes processing the read data with the descrambler when reading from a location in the memory that has had its zeroed out content written over with scrambled data.

The method may further comprise performing a background process comprising reading zeroed out content in memory address order and writing back the zeroed out content wherein the writing back includes scrambling the zeroed out content. The method may further comprise servicing a read request where the servicing of the read request comprises referring to information that indicates which memory addresses are storing non scrambled content and which memory addresses are not storing scrambled content.

The method may further comprise servicing a write request where the servicing of the write request comprises referring to information that indicates which memory addresses are storing non scrambled content and which memory addresses are storing scrambled content. The servicing of the write request comprises bypassing a scrambler if a target memory address of the write request is storing non scrambled content or processing the write request's write data with a scrambler if the target memory address of the write request is storing scrambled content. In a further embodiment the information is a single memory address value.

Implementation of the method with program code stored on a computer readable storage medium has also been described.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method performed by a memory controller, comprising:
   during boot up, issuing a command to a memory to cause the memory to zero out its content;
   receiving first read data from a memory module at a memory controller read data path node and bypassing a descrambler because the first read data has been read from a location in the memory that has not had its zeroed out content written over the scrambled data; and,
   receiving second read data from the memory module at the memory controller read data path node and processing the second read data with the descrambler because the second read data has been read from a location in the memory that has had its zeroed out content written over with scrambled data.

2. The method of claim 1 further comprising performing a background process comprising reading zeroed out content in memory address order and writing back the zeroed out content wherein the writing back includes scrambling the zeroed out content.

3. The method of claim 1 further comprising servicing a read request, the servicing of the read request comprising referring to information that indicates which memory addresses are storing non scrambled content and which memory addresses are not storing scrambled content.

4. The method of claim 1 further comprising servicing a write request, the servicing of the write request comprising referring to information that indicates which memory addresses are storing non scrambled content and which memory addresses are storing scrambled content, the servicing of the write request comprising bypassing a scrambler if a target memory address of the write request is storing non scrambled content or processing the write request's write data with a scrambler if the target memory address of the write request is storing scrambled content.

5. The method of claim 4 wherein the information is a single memory address value.

6. A non-transitory computer readable storage medium comprising program code that when processed by a memory controller causes the memory controller to perform a method, comprising:
   during boot up, issuing a command to a memory to cause the memory to zero out its content;
   receiving first read data from a memory module at a memory controller read data path node and bypassing a descrambler because the first read data has been read from a location in the memory that has not had its zeroed out content written over the scrambled data; and,
   receiving second read data from the memory module at the memory controller read data path node and processing the second read data with the descrambler because the second read data has been read from a location in the memory that has had its zeroed out content written over with scrambled data.

7. The computer readable storage medium of claim 6 wherein the method further comprises performing a background process comprising reading non scrambled content in memory address order and writing back the non scrambled content wherein the writing back includes scrambling the non scrambled content prior to its being written back.

8. The computer readable storage medium of claim 6 wherein the method further comprises servicing a read request, the servicing of the read request comprising referring to information that indicates which memory addresses are storing non scrambled content and which memory addresses are not storing scrambled content.

9. The computer readable storage medium of claim 6 wherein the method further comprises servicing a write request, the servicing of the write request comprising referring to information that indicates which memory addresses are storing non scrambled content and which memory addresses are storing scrambled content, the servicing of the write request comprising bypassing a scrambler if a target memory address of the write request is storing non scrambled content or processing the write request's write data with a scrambler if the target memory address of the write request is storing scrambled content.

10. The computer readable storage medium of claim 9 wherein the information is a single memory address value.

11. An apparatus, comprising:
    a memory controller comprising a first read datapath and a second read datapath, the first read datapath comprising a descrambler, the second read datapath bypassing the descrambler, the first and second read data paths originating from a same memory controller read data path node so that the first and second read data paths are able to handle read data from a same memory module, the memory controller to issue a command to the memory module upon boot-up to cause the memory module to zero out its content, the memory controller to enable the first datapath when reading from a location in the memory module that has had its zeroed out content written over with scrambled data, the memory controller to enable the second datapath when reading from a location in the memory module that has not had its zeroed out content written over with scrambled data.

12. The apparatus of claim 11 wherein the memory controller further comprises a first write datapath and a second write datapath, the first write datapath comprising a scrambler, the second write datapath bypassing the scrambler.

13. The apparatus of claim 12 wherein the memory controller is to enable the first write datapath when writing to a memory location that is storing scrambled content and is to enable the second write datapath when writing to memory location that is not storing scrambled content.

14. The apparatus of claim 12 further comprising background process circuitry to read from memory addresses containing non-scrambled data content in order and to write back the non-scrambled read data content along the first write datapath so as to scramble the non-scrambled read data prior its write back, the background process circuitry comprising circuitry to store information that indicates which memory addresses have been written back with scrambled read data content.

15. The apparatus of claim 14 wherein the memory controller is to refer to the information when servicing a read request to understand whether to enable the first read datapath or the second read datapath.

16. The apparatus of claim 14 wherein the memory controller is to refer to the information when servicing a write request to understand whether to enable the first write datapath or the second write datapath.

17. The apparatus of claim 11 wherein the memory controller comprises circuitry to keep information that indicates which addresses of the memory module have been written to with scrambled data and which addresses of the memory module have not been written to with scrambled data.

18. A computing system, comprising
a plurality of processing cores;
a memory module;
an I/O control hub;
a memory controller coupled to the memory module, the memory controller comprising a first read datapath and a second read datapath, the first read datapath comprising a descrambler, the second read datapath bypassing the descrambler, the first and second read data paths originating from a same memory controller read data path node so that the first and second read data paths are able to handle read data from the memory module, the memory controller to issue a command to the memory module upon boot-up of the computing system to cause the system memory to zero out its content, the memory controller to enable the first datapath when reading from a location in the memory module that has had its zeroed out content written over with scrambled data, the memory controller to enable the second datapath when reading from a location in the memory module that has not had its zeroed out content written over with scrambled data.

19. The computing system of claim 18 wherein the memory controller further comprises a first write datapath and a second write datapath, the first write datapath comprising a scrambler, the second write datapath bypassing the scrambler.

20. The computing system of claim 19 wherein the memory controller is to enable the first write datapath when writing to a memory module location that is storing scrambled content and is to enable the second write datapath when writing to a memory module location that is not storing scrambled content.

21. The computing system of claim 19 further comprising background process circuitry to read from memory addresses containing zeroed out content in order and to write back the zeroed out read data along the first write datapath, the background process circuitry comprising circuitry to store information that indicates which memory addresses have been written back with scrambled zeroed out read data.

22. The computing system of claim 21 wherein the memory controller is to refer to the information to when servicing a read request to understand whether to enable the first read datapath or the second read datapath.

23. The computing system of claim 21 wherein the memory controller is to refer to the information when servicing a write request to understand whether to enable the first write datapath or the second write datapath.

24. The computing system of claim 18 wherein the memory controller comprises circuitry to keep information that indicates which addresses of the memory module have been written to with scrambled data and which addresses of the memory have not been written to with scrambled data.

* * * * *